United States Patent [19]
Inaba et al.

[11] 3,881,139
[45] Apr. 29, 1975

[54] 3-AXIS PULSE OPERATED LINEAR MOTOR

[75] Inventors: Seiuemon Inaba, Kawasaki; Hiromichi Shichida; Kenichi Toyoda, both of Tokyo, all of Japan

[73] Assignees: Fujitsu Limited; Fujitsu Fanuc Limited, both of Tokyo, Japan

[22] Filed: Nov. 16, 1973

[21] Appl. No.: 416,659

[52] U.S. Cl. .................. 318/38; 318/115; 318/135; 310/12
[51] Int. Cl. ........................................ H02k 41/02

[56] References Cited
UNITED STATES PATENTS
2,911,538  11/1959  Munz .................................. 318/687
3,268,747  8/1966  Snowdon ............................ 310/13

*Primary Examiner*—Donovan F. Duggan
*Attorney, Agent, or Firm*—Maleson, Kimmelman & Ratner

[57] ABSTRACT

A pulse operated electromagnetic drive system is referred to as a pulse operated linear motor in the present invention. The pulse operated linear motor comprises a first movable element which is restrained to move only in a first direction by cooperating electromagnetically with a first stator, a second movable element located on the first movable element which is restrained to move individually only in a second direction perpendicular to the first direction by cooperating electromagnetically with a second stator but which moves together with the first movable element, and a third movable element located on the second movable element which is restrained to move only in a third direction perpendicular to the first and second directions by cooperating electromagnetically with a third stator but which moves together with the second movable element, whereby the third movable element can move to any position in a space defined by the motor.

2 Claims, 26 Drawing Figures

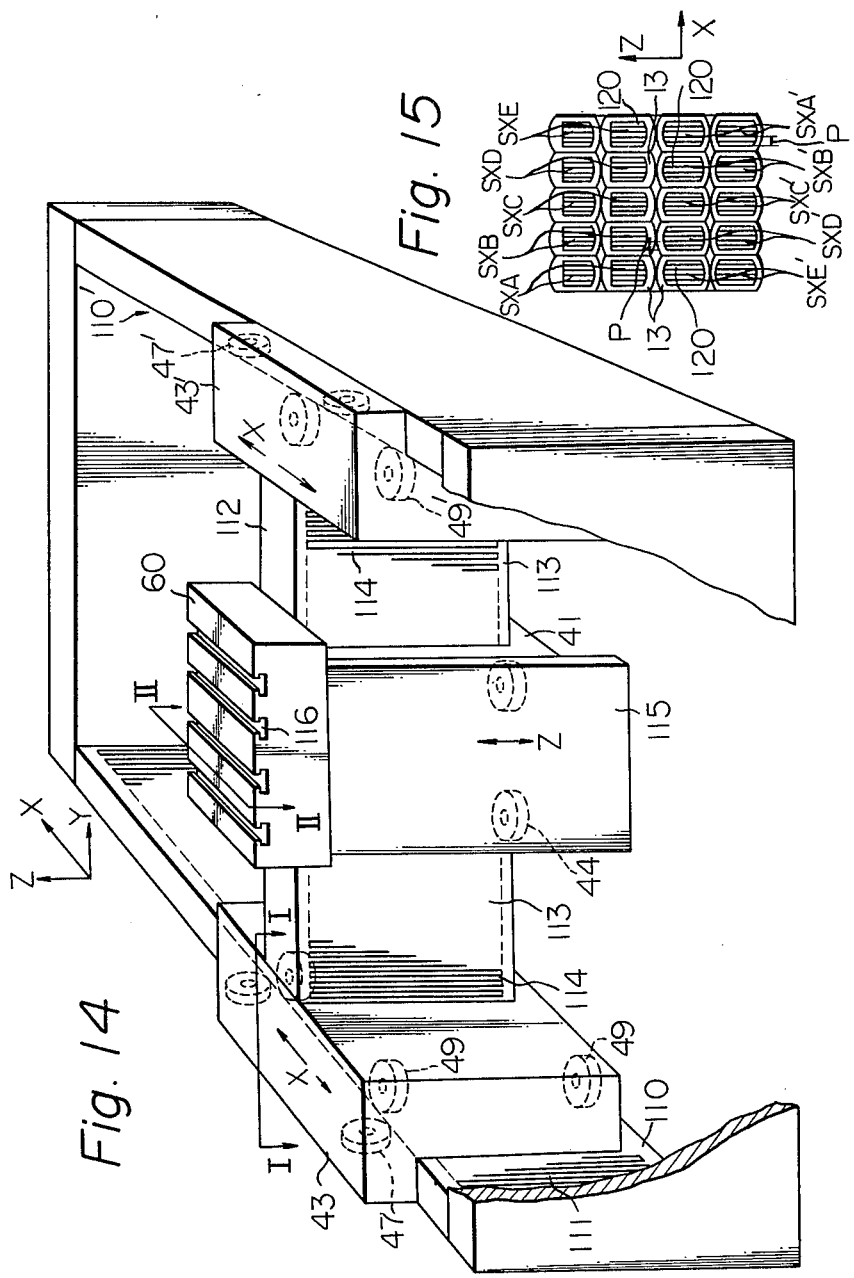

3-AXIS PULSE OPERATED LINEAR MOTOR

The present invention relates in general, to a pulse operated electromagnetic drive system in which a movable element moves along one direction slightly apart from and parallel to the surface of a cooperating stationary element, the movement of the movable element being electromagnetically controlled in response to command pulses applied from control circuits. Specifically, the present invention refers to such a drive system as a pulse operated linear motor and also, refers to the movable and the cooperating stationary elements as a slider and a stator respectively. Said movable element, that is, the slider, can move with constant fine steps in one direction along the surface of said stator by means of said command pulses and the stator acts as a scale at the same time. Said pulse operated linear motor includes at least one slider made of magnetic material surrounded by exciting coils which receive said command pulses and includes at least one stator made of magnetic material which cooperates electromagnetically with said slider. Further, said pulse operated linear motor includes means to provide a space between the movable element and the surface of the stator which acts as a scale to prevent direct contact of said movable element with the stator, because a strong attractive force occurs between them when said exciting coils are energized. The moving action of said slider is very useful when the pulse operated linear motor is utilized in, for example, an automatic manufacturing system which requires fine machining control without manual operation by setting work on the surface of the movable element or slider. The advantages of the pulse operated linear motor are as follows. When a moving action along one direction is required, the moving action has normally been produced by converting a circular motion from the electric motor or handle to a rectilinear motion by using a converting means. This converting means is commonly realized by the feed screw or a similar type of screw. However, in the pulse operated linear motor no converting means is required as the rectilinear motion is directly produced. Further, it is a well-known defect that a converting means such as the feed screw creates backlash during an operation. It is obvious that this backlash causes errors, thereby forfeiting high accuracy for manufacturing works. Consequently, it can easily be recognized that the pulse operated linear motor can be operated with high accuracy because the pulse operated linear motor, as mentioned above, needs no converting means such as the feed screw which creates backlash. Further, the converting means such as the feed screw, is worn away during operation. As a result, a manufacturing system including said converting means requires periodic inspection and maintenance. In this respect, the pulse operated motor can be maintenance free because no converting means is involved. In addition, a manufacturing system comprised of the pulse operated linear motor makes almost no noise and can deliver work with high speed to a desired position.

Said pulse operated linear motor has already been utilized widely in manufacturing systems such as numerically controlled manufacturing machines. Usually, the pulse operated linear motor is comprised of a first slider, a second slider, a first and second stator, the stators cooperating electromagnetically with the first and second slider, respectively. Said first and second stator have magnetic and non-magnetic materials arranged at predetermined intervals both in first and second directions perpendicular to each other on one surface, where said magnetic materials forming stator teeth act as pole pieces which cooperate electromagnetically with the first slider and the second slider, respectively. The first slider is restrained to move only in said first direction. The second slider, located on the first slider, is restrained to move individually only in said second direction but since the second slider also moves together with said first slider in said first direction, the second slider can move in any direction on the plane above the surface of said first and second stator by means of fine steps in either a first or a second direction or in both said directions simultaneously, according to the command pulses from said control circuit. The above-mentioned pulse operated linear motor which has a first and second slider, and a first and second stator is usually called a surface pulse motor. When the surface pulse motor is utilized in a manufacturing system, especially a numerically controlled manufacturing machine, a work to be processed according to a design, is set on the second slider and the work moves together with the movement of the second slider. The work is produced with the desired configuration, hole, threaded hole or groove, by means of cutting tools such as a drill and/or milling cutter which are stationary with regard to the work. Thus, a work which is set on the second slider can be delivered to any position on one surface according to design. However, it should be pointed out that said surface pulse motor can deliver a work only on the horizontal plane. So, a work set on said surface pulse motor cannot follow completely a complicated design. In recent years, the requirement has arisen, for a pulse operated motor which can deliver a work to any position within a space defined by the motor.

Therefore, it is a principal object of the present invention to provide a pulse operated linear motor with a third slider which can move vertically and to any position along a third direction perpendicular to said first and second directions in response to command pulses from a control circuit, whereby a work set on the top surface of the third slider can be delivered to any position within a defined space.

Another object of the present invention is to provide a balancing means. The combined weights of a work and said third slider exert a downward force, because of gravitational pull. When the third slider cooperating electromagnetically with the third stator moves vertically, said downward force prevents the third slider, as well as the work, from moving smoothly and with high accuracy along the third direction. Consequently, said balancing means is required to countermand the downward force.

The present invention will be more apparent from the ensuing description with reference to the accompanying drawings wherein.

Figure 7:
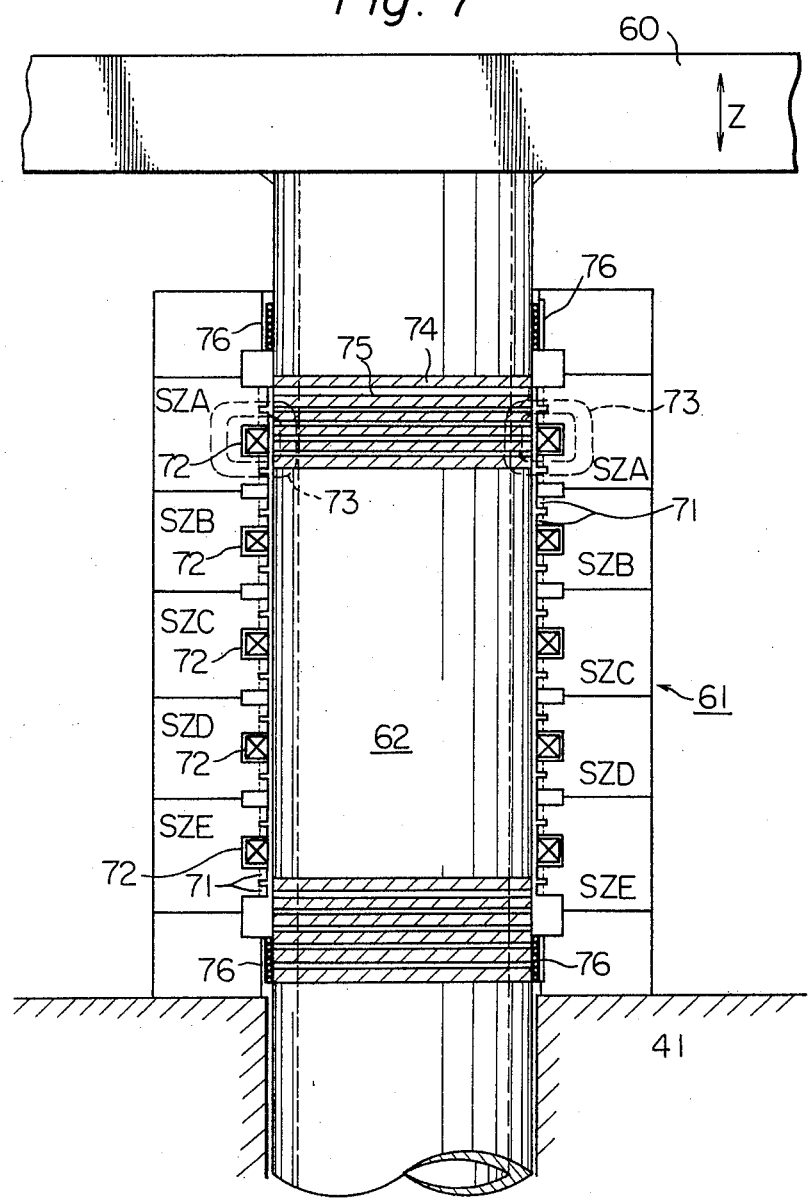
Figure 8:
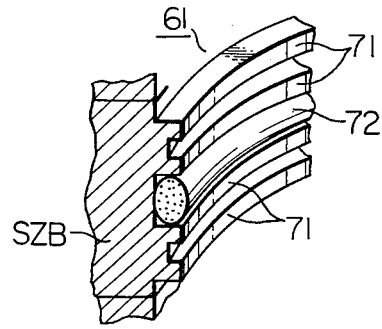
Figure 9:
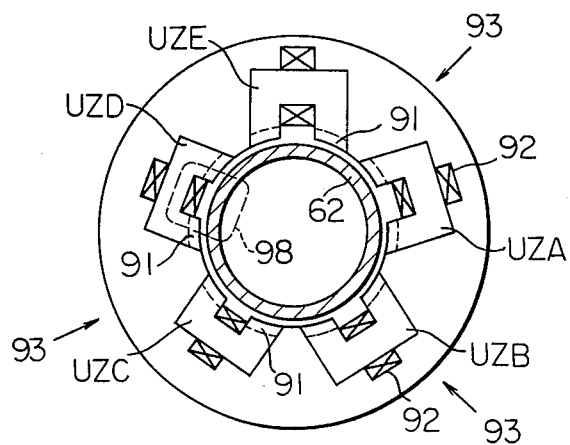
Figure 10:
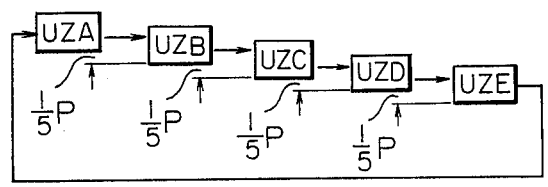
Figure 11:
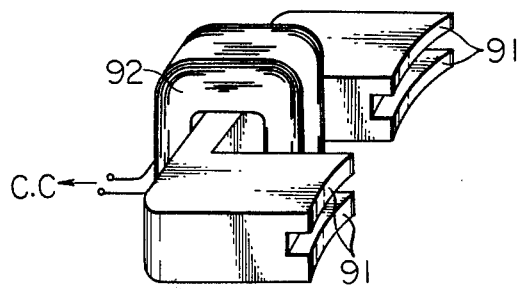
Figure 12:
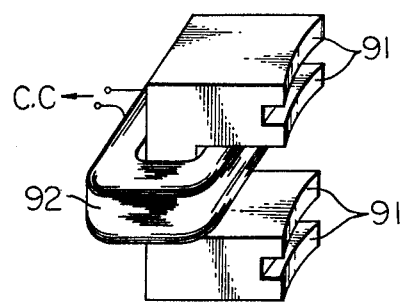
Figure 13:
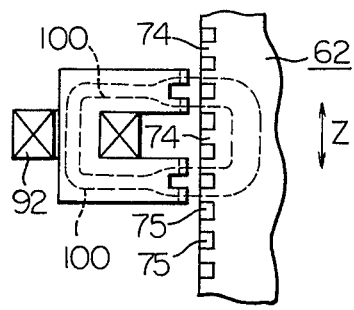
Figure 16:
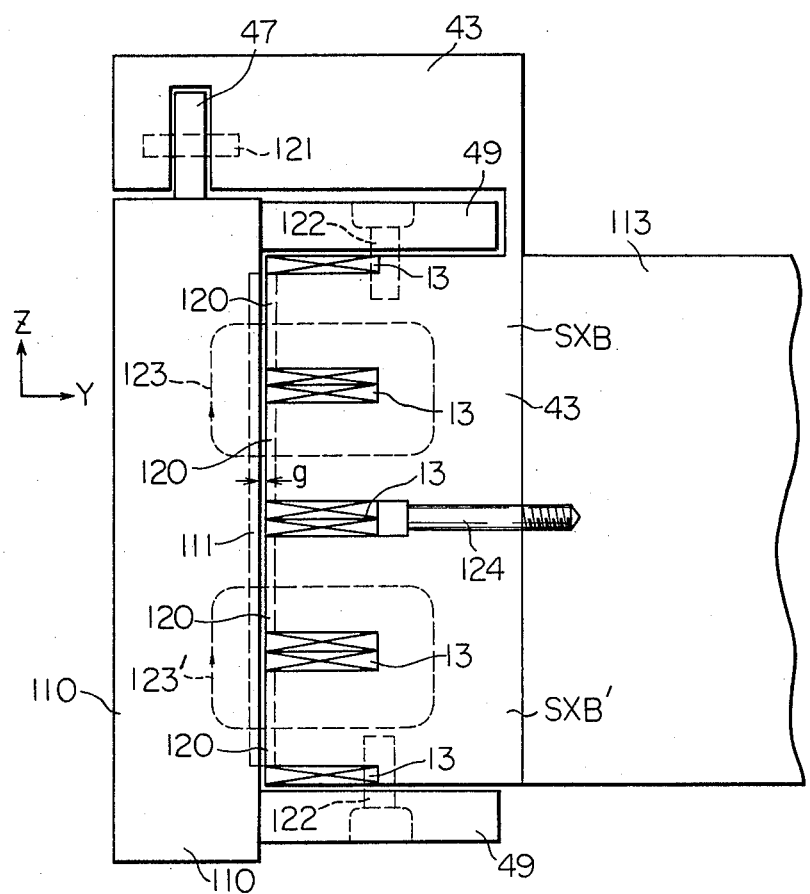
Figure 17:
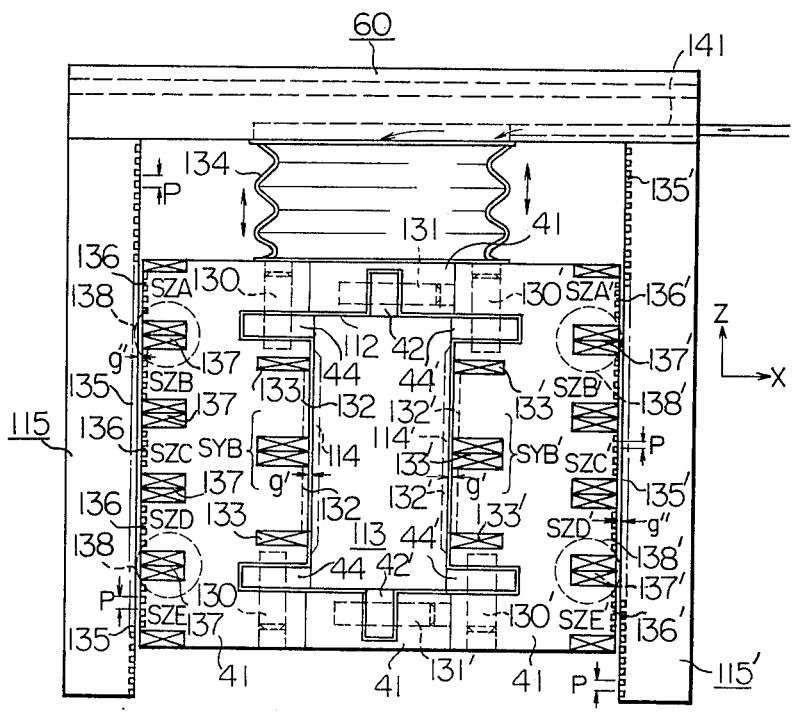
Figure 18:
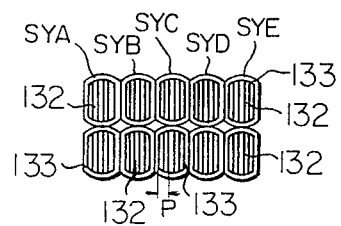
Figure 19:
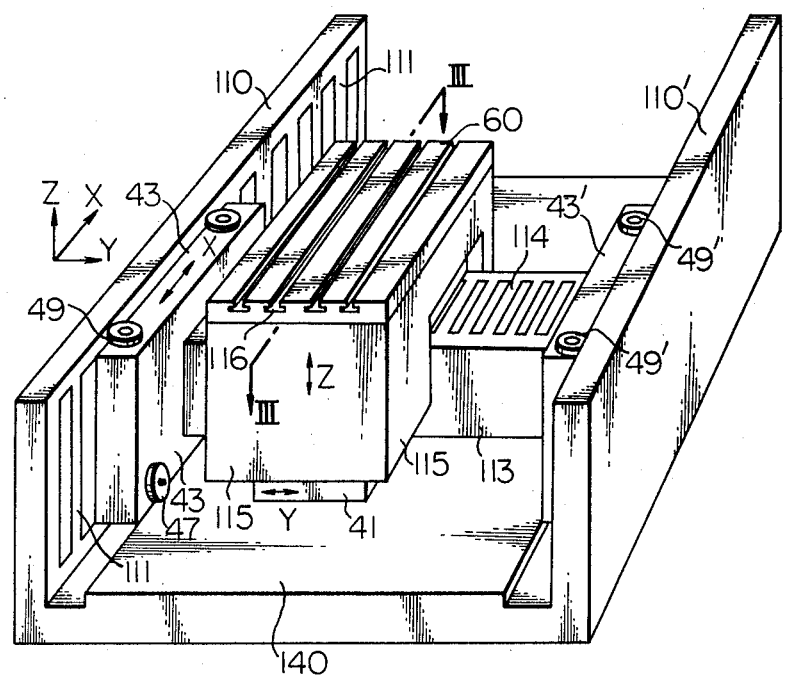
Figure 20:
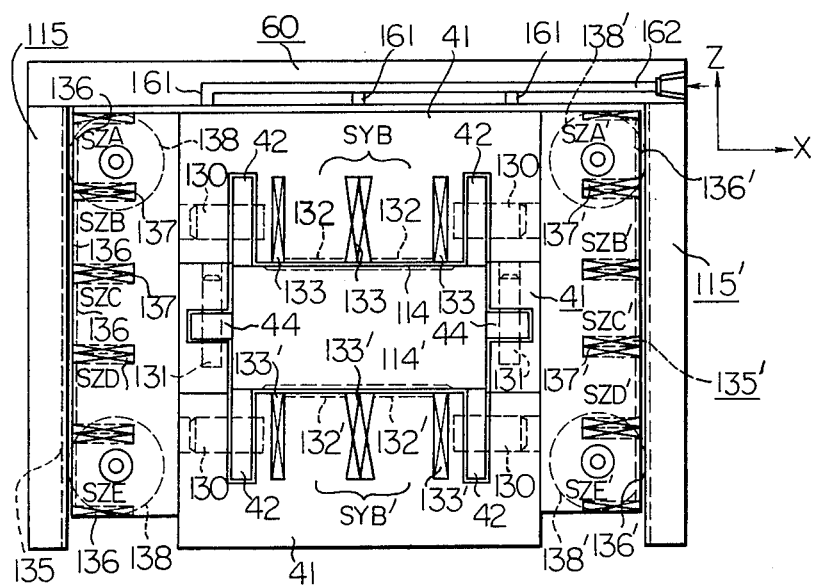
Figure 21:
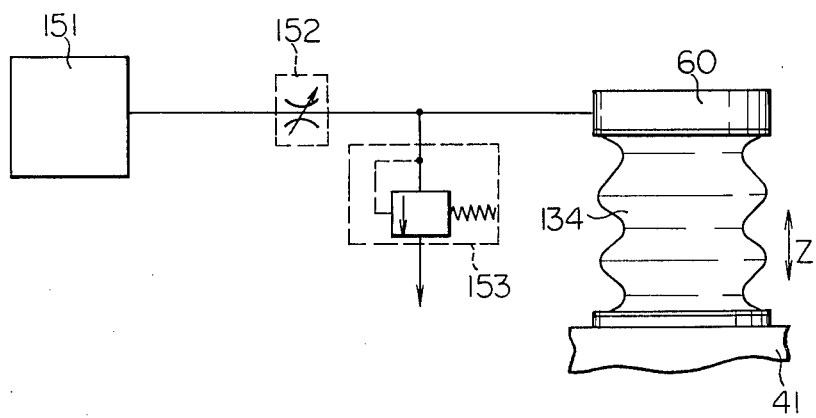

FIG. 7 provides an explanatory illustration of the third slider and the third stator of the present invention;

FIG. 8 is an enlarged partial perspective and sectional view of the third stator piece of the present invention;

FIG. 9 is a plane view providing an explanatory illustration of another embodiment of the third stator pieces according to the present invention;

FIG. 10 shows an arrangement of the third stator pieces seen from the angle of arrows 93 in FIG. 9;

FIG. 11 is a perspective view of the third stator piece of FIG. 9;

FIG. 12 is a perspective view of another embodiment of the stator piece shown in FIG. 9;

FIG. 13 is a partial sectional view of an arrangement of the third stator piece shown in FIG. 12 and the third slider of the present invention;

FIG. 14 is a perspective view of a second embodiment of a pulse operated linear motor of the present invention;

FIG. 15 is a plane view of an arrangement of the first slider teeth of the present invention;

FIG. 16 is a sectional view taken along the line I — I in FIG. 14;

FIG. 17 is a sectional view taken along the line II — II in FIG. 14;

FIG. 18 is a plane view of an arrangement of the second slider teeth of the present invention;

FIG. 19 is a perspective view of a third embodiment of a pulse operated linear motor of the present invention;

FIG. 20 is a sectional view taken along the line III — III in FIG. 19;

FIG. 21 is a block diagram of a control apparatus of the balancing apparatus of the present invention.

Figure 1A:
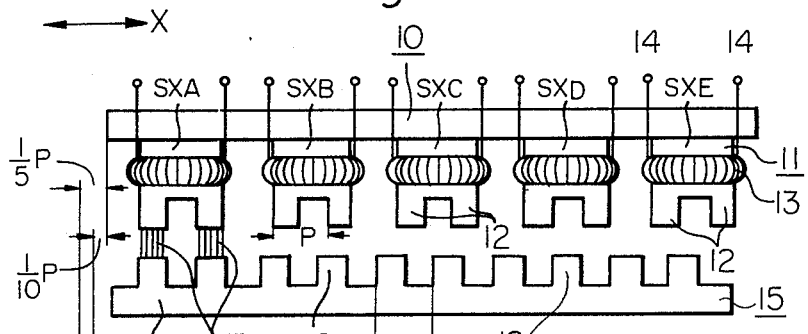
FIGS. 1A, 1B and 1C are enlarged side views illustrating the principle with respect to a moving action of a pulse operated linear motor, also called a linear electric pulse motor.
Figure 1B:
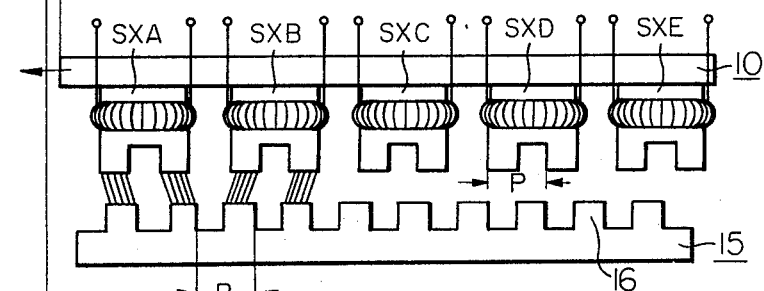
Figure 1C:
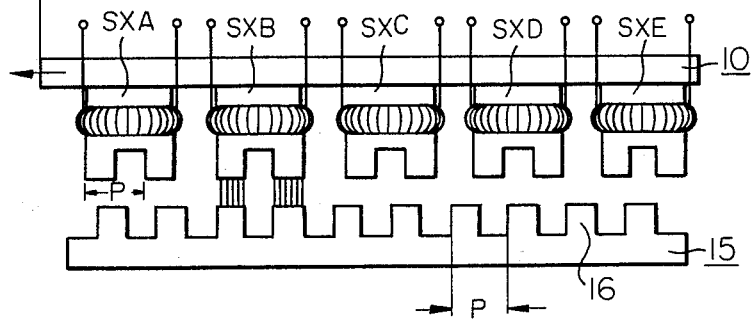

The principle with respect to a moving action of the pulse operated linear motor will be described with reference to FIGS. 1A, 1B and 1C. In FIGS. 1A, 1B and 1C, it should be noted that some modifications were effected for simplification of explanation. It should also be noted that the explanation of the principle applicable to all similar inventions is effected only with respect to the first sliders fixed to the movable body, because the principle also applies to the second sliders fixed to the same movable body.

Figure 2:
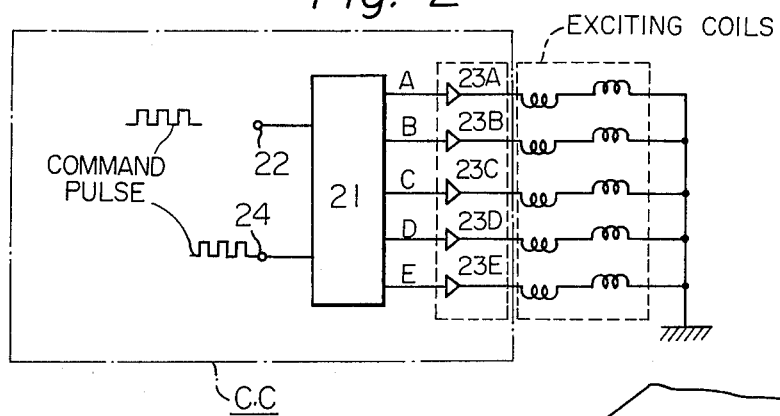
FIG. 2 is a block diagram of a control circuit.

In FIGS. 1A, 1B and 1C, 10 designates the movable body to which X-sliders that is the first sliders, SXA, SXB, SXC, SXD and SXE, made of magnetic materials, are attached and at the top left of FIG. 1A, X indicates the direction in which the slider moves along the X-axis. The X-axis corresponds to the first direction mentioned previously. Accordingly, the slider which moves in a direction along the Y-axis, perpendicular to the X-axis, will be expressed by the Y-slider comprising Y-sliders SYA, SYB, SYC, SYD and SYE. Each X-slider is comprised of a pole piece 11 to which a plurality of slider teeth 12 are attached and exciting coils 13 which surround the pole piece 11. Each terminal 14 of exciting coils 13 is connected to the control circuit CC (FIG. 2). The control circuit decides a sequence by which each exciting coil is energized. The reference numeral 15 designates the stator to which stator teeth 16 are attached. These teeth 16 are arranged in a direction along the X-axis at a predetermined pitch "P". It should be understood that other teeth 16 (not shown) are arranged in a direction along the Y-axis at a predetermined pitch "P'", preferably $P = P'$ which equals nearly 1 mm, and cooperate electromagnetically with the Y-slider. As a result the Y-slider can move along the Y-axis direction. The slider teeth 12 are also arranged at the predetermined pitch P.

Figure 1D:
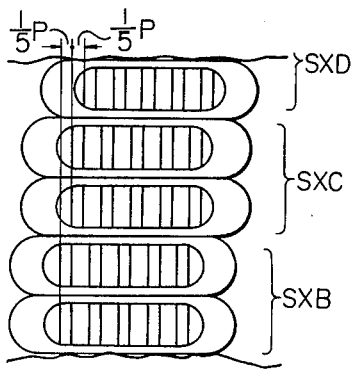
FIG. 1D is a partially enlarged plane view from the bottom of a slider.

The pitch with which the X-sliders are arranged is selected to be one-fifth P when there are five X-sliders, SXA, SXB, . . . . , SXE. If the movable element 10 is driven along the X-axis direction by three X-sliders SXA, SXB and SXC, said pitch should be selected equal to one-third P. The pitch with which the X-sliders are arranged will be clarified by referring to FIG. 1D. FIG. 1D is a partially enlarged plane view from the bottom showing the actual configuration of X-sliders.

Moving action is explained as follows. When amplified command pulses from the output of the control circuit C.C shown in FIG. 2, are applied to the X-exciting coils attached to the X-slider SXA, an attractive force occurs between the pair of slider teeth of the X-slider SXA and a pair of adjacent stator teeth. This attractive force is depicted by imaginary parallel lines 17 in FIG. 1A. The X-slider SXA, and accordingly, the movable body 10, moves to a position where the center portion of the slider teeth coincides with the center portion of the adjacent stator teeth 16. Next, two separate amplified command pulses from the output of the control circuit C.C are applied to the X-exciting coils attached to the X-slider SXA and to the X-exciting coils attached to the X-slider SXB. Two attractive forces occur which are depicted by the two groups of parallel lines shown in FIG. 1B. The X-sliders SXA and SXB, and accordingly, the movable body 10, move to a position where a middle point between the center portions of the slider teeth attached to SXA and SXB coincide with a middle point between the center portions of the two adjacent stator teeth 16. At this time, one step movement of the movable body 10 along the X-axis direction is obtained and the length of the one step corresponds to one-tenth P. In FIG. 1C, if the P is selected to be 1 (mm), one step becomes 0.1 (mm). Next, only the exciting coil attached to the X-slider SXB is energized and the X-slider SXB moves to a portion where the center portion of the slider teeth of SXB coincides with the center portion of the adjacent stator teeth 16.

At this time, one step movement, that is one-tenth P, of the movable body 10 is obtained in the same manner as the above explanation with regard to FIG. 1A. Consequently, when the exciting coils attached to the X-sliders SXA, SXB, . . . , SXE are energized in this order: (SXA), (SXA, SXB), (SXB), (SXB, SXC), (SXC), (SXC, SXD), (SXD), (SXD, SXE), (SXE) and (SXE, SXA) the movable body 10 steps one-tenth P upon each respective energization along the X-axis direction.

It should be noted that the movable body 10 also steps one-tenth P upon respective energization along the Y-axis direction when the Y-sliders are energized in this order: (SYA), (SYA, SYB), (SYB), (SYB, SYC), (SYC), (SYC, SYD), (SYD), (SYD, SYE), (SYE) and (SYE, SYA).

The sequence for energizing the exciting coils is not limited to the above-mentioned sequence and orders such as (SXA, SXB), (SXA, SXB, SXC), (SXB, SXC), (SXB, SXC, SCD), (SXC, SXD), (SXC, SXD, SXE), (SXD, SXE), (SXD, SXE, SXA), (SXE, SYA) and (SXE, SXA, SXB) are more preferable in view of increased driving force and reduced vibration in actual operation. These sequences are provided by control circuit C.C shown in FIG. 2.

FIG. 2 is a block diagram of the control circuit C.C. The X-slider is driven by one control circuit C.C and the Y-slider is driven by another control circuit C.C. Both control circuits have the same block diagram shown in FIG. 2. Operation of the control circuit is as follows.

Command pulses are applied to exciting controller 21 through the forward input terminal 22. The exciting controller 21 decides energization orders of the exciting coils of the slider and the outputs from the exciting controller 21 excite the selected exciting coils through amplifiers 23A, 23B, . . . , 23E in accordance with said energization orders. In FIG. 2, each set of two reactance elements connected in series, indicates a pair of exciting coils attached to each slider. When reversed energization orders are required, the command pulses are applied to the reverse input terminal 24.

Figure 3A:
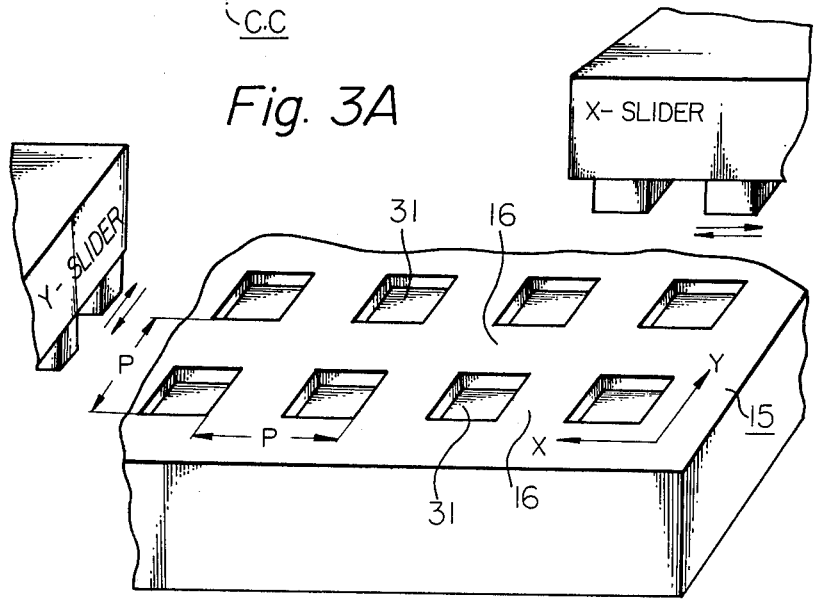
FIGS. 3A, 3B and 3C are enlarged perspective views of stator teeth.

FIG. 3A is a first example showing an enlarged perspective view of the stator 15 being provided with the stator teeth 16, made of magnetic materials, wherein numerous cavities 31 are formed and, as a result, the remaining portions form the stator teeth like a grid along the X- and Y-axes. The cavities 31 are filled with non-magnetic material. However, it is not actually necessary to fill the cavities with materials such as glass, resin, aluminum or brass because air is also a non-magnetic material. In this drawing, X- and Y-sliders are separated from said movable body for simplification.

Figure 3B:
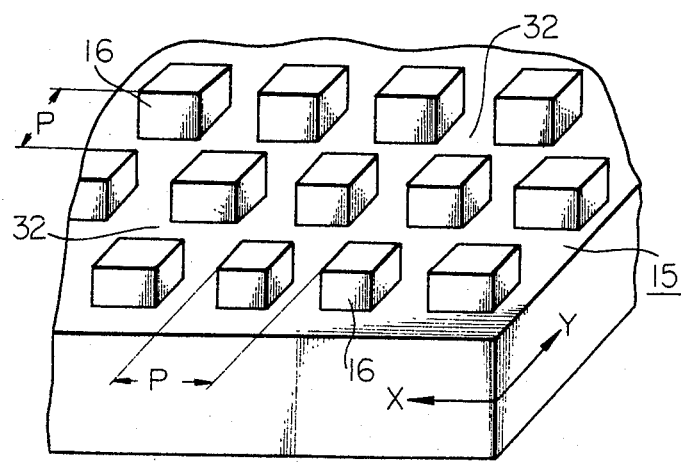

FIG. 3B is a second example showing an enlarged perspective view of the stator 15 being provided with the stator teeth 16 wherein grooves 32 are formed like a grid and, as a result, the remaining projected portions form the stator teeth along the X- and Y-axes.

Figure 3C:
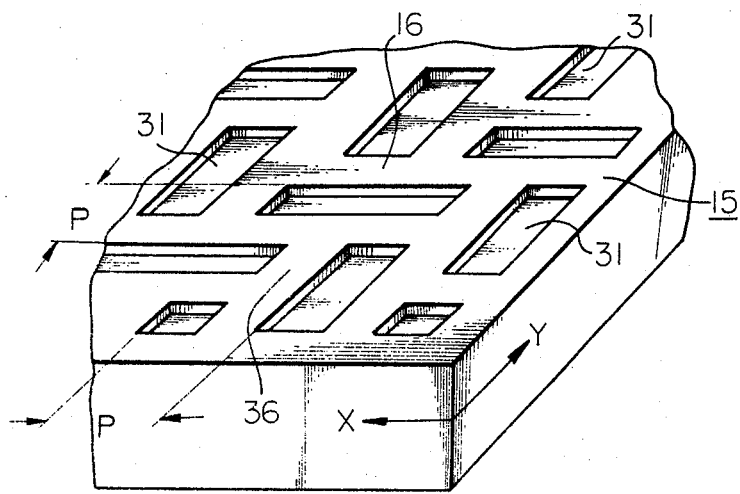

FIG. 3C is a third example showing an enlarged perspective view of the stator 15 being provided with the stator teeth 16 wherein two kinds of rectangular cavities are formed, the length of one type being parallel to the X-axis and the length of the other type being parallel to the Y-axis.

Figure 4:
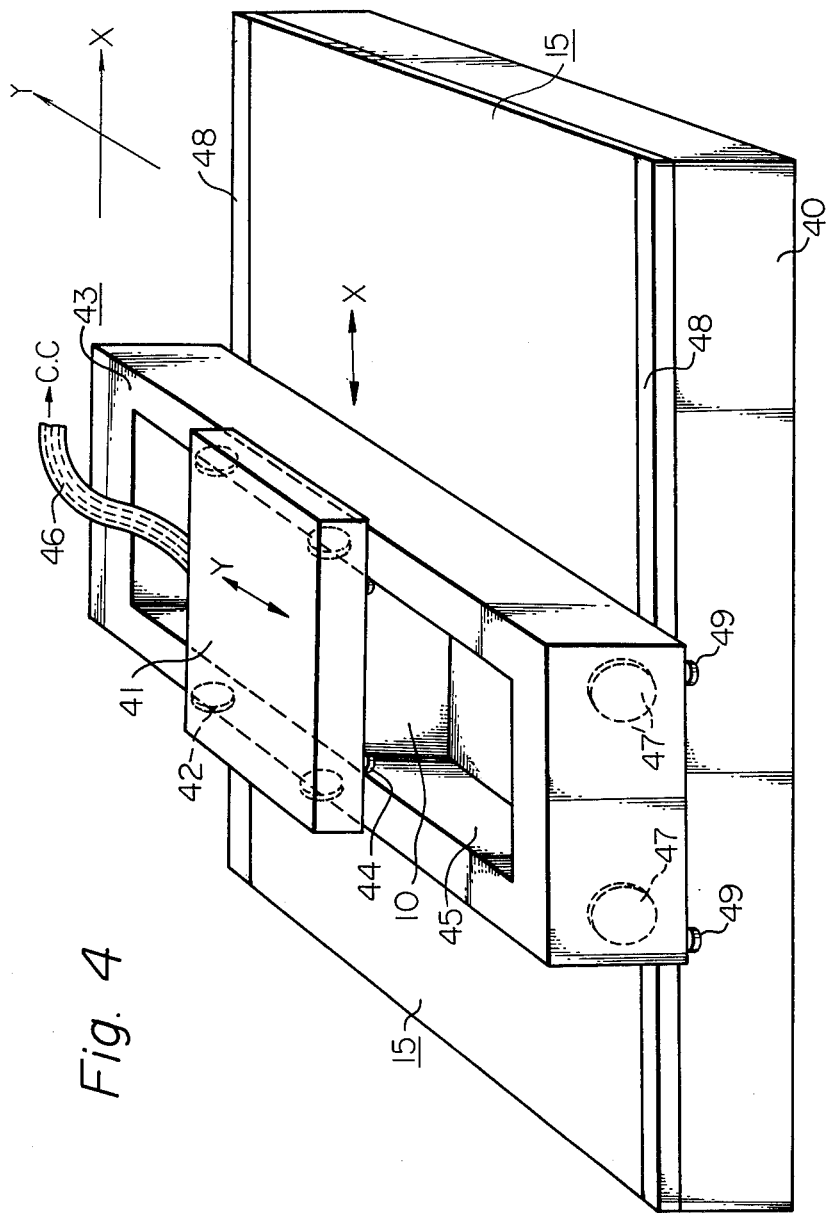
FIG. 4 is a perspective view providing an explanatory illustration of a typical pulse operated linear motor of the prior art.

FIG. 4 is a perspective view providing an explanatory illustration of a typical pulse operated linear motor of the prior art. In FIG. 4, 40 designates the base of a pulse operated surface motor and stator 15 is located on the surface of the base 40. The stator 15 is provided with stator teeth 16 (not shown) in a manner such as is shown in FIGS. 3A, 3B or 3C. The stator teeth 16 cooperate electromagnetically with the X- and Y-sliders teeth 12 (not shown in FIG. 4), and these X- and Y-sliders teeth 12 are arranged on the bottom of the movable body 10. The movable body 10 is mounted to the bottom of a second movable element 41. The second movable element 41 is provided with rollers 42 rotatable on the top surface of a first movable element 43, keeping a small vertical gap between the X- and Y-sliders teeth located on the movable body 10 and the stator teeth 16 mounted on stator 15. The second movable element 41 is further provided with guide rollers 44, at its four corners, rotatable on the side surfaces 45 of the first movable element 43 so that the second movable element may displace to any selected position along the Y-axis direction when the Y-sliders are energized by the amplified command pulses from control circuit C.C through a feed line 46 thereby accurately, smoothly and selectively positioning the second movable element 41 along the Y-axis direction. The first movable element 43 is also provided with rollers 47 rotatable on rail faces 48 and the bottom surface of the first movable element 43 maintains a small vertical gap with the surface of the stator 15 during movement. The first movable element 43 is further provided with guide rollers 49, at its four corners, rotatable on the side surfaces of the base 40 so that the second movable element may displace to any selected position by pushing the side surfaces 45 of the first movable element 43 along the X-axis direction when the X-sliders are energized by amplified command pulses from control circuit C.C through the feed line 46 thereby accurately, smoothly and selectively positioning the second movable element 41 along the X-axis direction. Thus, the second movable element 41 is capable of being displacing to any selected position on the surface of the stator 15 by the X- and Y-sliders upon their being energized by the command pulses through the feed line 46.

It is easily recognized that a piece of work fixed on the surface of the second movable element 41 can move accurately and smoothly to any selected portion along the surface of the stator 15. It should be noticed that this high accuracy and smooth moving action are obtained regardless of the weight of the piece of work fixed on the second movable element 41. When it is necessary to deal with heavy pieces of work, it is desirable to construct the second movable element 41, the first movable element 43 and rollers 42, 47 out of durable material such as aluminium, brass or similar materials. It is also necessary to design the construction of the first and second movable elements so that they are mechanically strong.

Figure 5:
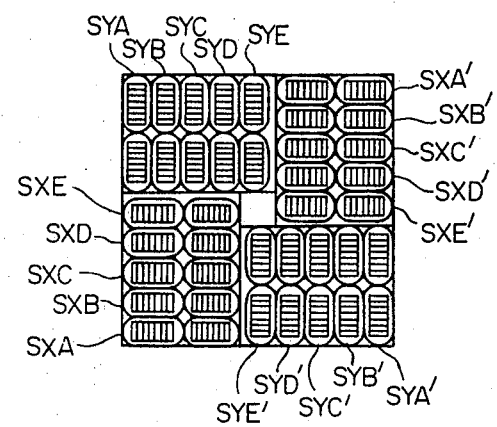
FIG. 5 is a bottom view of the movable body shown in FIG. 4.

FIG. 5 is one example of a bottom view of the movable body 10 where the X-sliders, SXA and SXA' (also SXB and SXB', . . . . , SXE and SXE') and the Y-sliders SYA and SYA' (also SYB and SYB', . . . . , SYE and SYE') are respectively energized at the same time according to the command pulses through the feed line 46.

Figure 6:
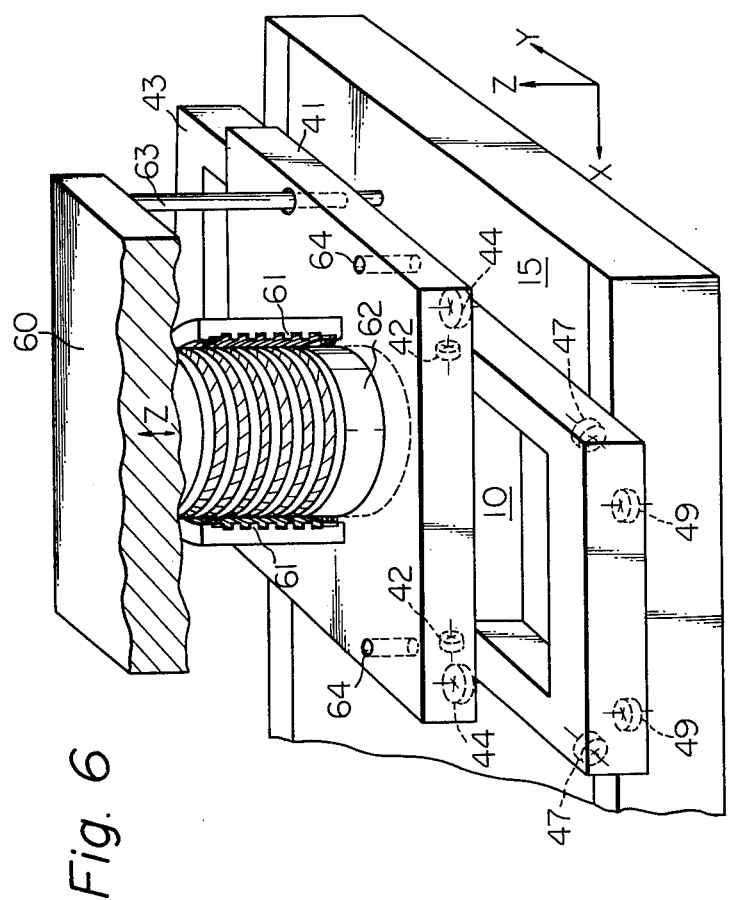
FIG. 6 is a perspective view, partially cut off, showing a first embodiment of a pulse operated linear motor according to the present invention.

FIG. 6 is a perspective view, partially cut off, of a first embodiment of a pulse operated linear motor according to the present invention. As can be seen in FIG. 6, a third movable element 60, a third stator 61 and a third slider 62 are located on the top surface of the second movable element 41. And the second movable element 41 is located on the top surface of the first movable element 43. These first and second movable elements move along X- and/or Y-axis slightly above the top surface of the stator 15 by means of the movable body 10 as mentioned before. When the second movable element 41 moves to a desired position on a plane, the third movable element 60, as well as the work set on the top surface of the third movable lement 60, also moves to the desired position horizontally on another plane. Because the third slider 62 moves vertically with respect to the third stator 61 which is fixed to the second movable element 41, the third movable element 60 which is fixed to the third slider 62 can also move vertically along the Z-axis to any desired plane. The third slider 62 cooperates electromagnetically with the third stator 61 and moves with fine steps upon energization through a feed line (not shown) from the control circuit. The principle with respect to the moving action between the third slider and the third stator is the same as previously explained with reference to FIGS. 1A, 1B and 1C. However, in this case the exciting coils are wound around the stator 61 instead of the slider 62. Consequently, the command pulses from the control circuit are applied to the stator 61. This will be clear from FIG. 7. Further, the third stator and the slider are respectively circular and cylindrical in shape. Referring again to FIG. 6, the third movable element 60 is further provided with guide bars 63 at its four corners. The guide bars 63 are slidable through guide holes 64 located at four corners of the second movable element 41. Thus, the third movable element 41 can move linearly along the Z-axis with the aid of said guide bars 63.

FIG. 7 is a detailed explanatory illustration of the third slider 62 and the third stator 61, shown in FIG. 6. In FIG. 7, the third stator 61 consists of five circular stator pieces SZA, SZB, SZC, SZD and SZE. Each stator piece has, on its inner surface, a plurality of circular stator teeth 71. The plurality of circular stator teeth 71 of each stator piece are arranged in a direction along the Z-axis at a predetermined pitch P. The stator pieces (SZA, SZB, . . . . , SZE) are arranged to slip off every one-fifth P from SZA → SZE, because there are five circular stator pieces. Each stator piece is further provided with circular exciting coils 72. The exciting coils 72 are connected to the control circuit through the feed line (not shown) and the command pulses are applied to the exciting coils 72. When the command pulses are applied, for example, to the circular stator piece SZA, a magnetic flux path is obtained through the stator teeth 71 and the slider 62 as shown in FIG. 7, by the dotted line 73. An attractive forve is then obtained between the stator teeth 71 and the slider 62. The cylindrical slider 62 consists of magnetic materials and non-magnetic materials arranged alternately in a direction along the Z-axis at a predetermined pitch. The magnetic materials form, as mentioned before, cylindrical slider teeth which cooperate electromagnetically with the stator teeth 72. The cylindrical slider teeth are designated by the hatching in FIG. 7 and by reference numeral 74. The cylindrical slider teeth 74 are arranged at the same pitch as the plurality of stator teeth 71 of each circular stator piece (SZA, SZB, . . . , SZE) in a direction along the Z-axis. The third movable element 60 can move upward and downward with fine steps upon respective energizing sequences. The grooves arranged between the slider teeth 74, indicated by reference numeral 75 in FIG. 7, are filled with non-magnetic materials such as resin, glass, aluminum or brass. However, it is not actually necessary to fill the spaces with non-magnetic materials because air is also a non-magnetic material. In this case, the slider 62 moves vertically by engaging its surface with ball-bush 76. Thus, the slider 62 can move maintaining a small gap between the surface of the slider 62 and the surface of the stator 61 by means of said ball-bush 76. Consequently, it is preferable to render the surface of the slider 62 smooth like a plane by filling said grooves 75 with a non-magnetic material such as resin. The ball-bush 76 can then contact the surface of the slider 62 without friction. It is further preferable to lighten the slider 62 by making it from a pipe as shown in FIG. 7.

FIG. 8 is an enlarged partial perspective and sectional view of one of the circular stator pieces (SZB) shown in FIG. 7.

FIG. 9 is a plane view providing an explanatory illustration of another embodiment of the third stator 61. The five circular stator pieces (SZA, SZB, . . . . , SZE) in FIGS. 6 and 7 are, in FIG. 9, changed to five U-shaped stator pieces. The U-shaped stator pieces UZA, UZB, UZC, UZD and UZE are arranged along the inner circular surface of the third stator 61 at the same pitch ($2\pi/5$ radian). Each stator piece (UZA, UZB, . . . . , UZE) has on its inner surface a plurality of stator teeth 91 which are arranged in a direction along the Z-axis at a predetermined pitch P. The pitch with which the stator pieces (UZA, UZB, . . . , UZE) is arranged, is selected to be one-fifth P. This arrangement of the stator pieces (UZA, . . . . UZE) will be clarified in FIG. 10. In FIG. 10 the arrangement of the stator pieces, actually arranged in a circle, is expressed linearly by rearranging the stator pieces UZA → UZE seen from the angle of arrows 93 in FIG. 9 from left to right for easy understanding. It is obvious that the distance along the Z-axis between the stator pieces UZA and UZE of FIG. 9 is very short compared to that of FIG. 7. Consequently, a small surface pulse motor can be obtained by arranging the stator pieces UZA, . . . , UZE of the third stator 61 such as shown in FIG. 9 without decreasing the length of movement along the Z-axis of the third movable element 60. Each stator piece UZA, . . . . , UZE is surrounded by exciting coils 92. FIG. 11 is a perspective view of one of the stator pieces (UZA, . . . , UZE) in FIG. 9. FIG. 12 is also a perspective view of another embodiment of the stator pieces UZA, . . . UZE). When the exciting coils 92 of FIG. 11 are energized by command pulses applied from the control circuit (C.C) a magnetic flux path is obtained, indicated by the dotted line 98 in FIG. 9. When the exciting coils 92 of FIG. 12 are energized in the same way, a magnetic flux path is obtained, indicated by dotted line 100 in FIG. 13. FIG. 13 is a partial sectional view of an arrangement of the stator pieces (shown in FIG. 12) and the slider 62.

As mentioned above, work set on the top surface of the third movable element 60 can be delivered accurately and quickly to any position in a defined space.

The construction of the typical pulse operated linear motor has already been described with reference to FIGS. 3A through 5. In the typical pulse operated linear motor, the first and second stator teeth are arranged respectively along X- and Y-axes, on the same surface, as shown in FIGS. 3A through 3C. Further, the first and second sliders are also arranged in the same movable body, as shown in FIG. 5. The grid type of arrangement as shown in FIGS. 3A through 3C, is not so preferable from the viewpoint of efficiency of a driving force and accuracy. In order to improve efficiency and accuracy, the first and second stators can be separated. The pulse operated linear motor is then comprised of a first base which corresponds to the base 40 in FIG. 4 and a second base. The first base is arranged along the X-axis and includes only the first stator. The second base is arranged along the Y-axis and includes only the second stator. In this case, the first and second sliders should also be separated and they would then cooperate electromagnetically with the separated first and second stators, respectively. This concept is realized for the pulse operated linear motor as shown in FIG.

14. FIG. 14 is a perspective view showing a second embodiment of the pulse operated linear motor in which the first, second and third movable elements move on the first, second and third stators respectively. The first, second and the third sliders which are fixed to the first, second and third movable elements, respectively, move along the X-, Y- and Z-axes respectively. The principle with respect to the moving action is the same as previously described with reference to FIGS. 1A through 1C.

In FIG. 14, the first movable element 43 (43') is located on the top surface of the first stator 110 (110') and is able to move by means of the rollers 47 (47') along the X-axis. The first movable element as shown in FIG. 15 is provided with the first sliders SXA, SXB, SXC, SXD and SXE (not shown) and if necessary, SXA', SXB', SXC', SXD' and SXE' (not shown) on the side surface, facing the surface of the stator 110 (110'), of the first movable element 43 (43'). The first sliders SXA, . . . SXE, and SXA', . . . SXE' cooperate electromagnetically with the first stator teeth 111 (111') shown in FIG. 14 and when the exciting coils 13 in FIGS. 1A and 15 are energized, the first sliders move with fine steps along the X-axis upon respective energization sequences. The first movable element 43 (43') is further provided with rollers 49 (49') rotatable on the side surface of the first stator 110 (110'). The rollers 49 (49') maintain a constant small gap along the X-axis between the surface of the first stator 110 (110') and the surface of the first sliders, that is X-sliders SXA, . . . ., SXE and SXA', . . . ., SXE'.

The second movable element 41 is located on the top surface 112 of the second stator 113 and is able to move on the top surface 112 by means of rollers (not shown) along the Y-axis. The second movable element 41 is provided with the second sliders SYA, SYB, SYC, SYD and SYE and, if necessary, SYA', SYB', SYC', SYD' and SYE' (not shown) on both inner surfaces, facing both surfaces of the second stator 113 (113'), of the second movable element 41. The second sliders SYA, . . . ., SYE and SYA', . . . SYE' are arranged in the same manner as shown in FIG. 18. The second sliders SYA, . . . , SYE and SYA', . . . , SYE' cooperate electromagnetically with the second stator teeth 114 (114') and can move with fine steps along the Y-axis upon respective energization sequences. The second movable element 41 is further provided with rollers 44 rotatable on another side surface of the second stator 113 (113'). The rollers 44 keep a constant small gap along the Y-axis between the surface of the second stator 113 and the surface of the second sliders SYA, . . . ., SYE and SYA', . . . , SYE'.

The third movable element 60 is located on the top surface (not shown) of the movable element 41 and is able to move along the Z-axis. The third movable element has a third slider 115 (115'). The third slider has teeth (not shown) on its inner surface arranged at the same pitch along the Z-axis. The third stator pieces SZA, SZB, SZC, SZD and SZE (not shown) which are arranged on the outer surface of the second movable element 41 along the Z-axis cooperate electromagnetically with the third slider teeth thus enabling the third slider 115 to move with fine steps along the Z-axis. Work set on the top surface of the third movable element 60 by using T-shaped fixing grooves 116, can be delivered accurately and quickly to any desired position within a defined space.

The construction of the second embodiment shown in FIG. 14 will be clarified by referring to FIGS. 16 and 17. FIG. 16 is a sectional view taken along the line I—I which cuts the X-sliders SXB and SXB' in FIG. 14. In FIG. 16, the first movable element 43 moves smoothly along the X-axis by means of roller 47 rotatable on the top surface of the first stator 110. The roller 47 is rotatably fixed to the first movable element 43 by a pin 121. The first movable element 43 is further provided with X-sliders, that is the first sliders, SXB and SXB'. Other X-sliders (SXA, SXA'), (SXC, SXC') (SXD, SXD') and (SXE, SXE') are also fixed to the first movable element 43 in such a manner as shown in FiG. 15. The X-sliders SXB and SXB' have a plurality of slider teeth 120, surrounded by the exciting coils 13 in such a manner as shown in FIG. 15 and cooperate electromagnetically with the first stator teeth 111 through a small constant air gap "g" (in FIG. 16). The constancy of the air gap g is maintained along the X-axis by means of roller 49 (located on both the upper and lower sides of the first movable element 43) which is fixed rotatably to the element 43 by a pin 122. When the exciting coils 13 are energized, the magnetic flux path is obtained such as shown by dotted lines 123 and 123'. Then the first movable element 43 can move to any position along the X-axis upon respective energization sequences. The principle with respect to the moving action of the X-sliders is the same as previously mentioned with reference to FIGS. 1A through 1D. The first stator teeth 111 are arranged along the X-axis at the same pitch P (see FIG. 14). The plurality of slider teeth 120 of each X-slider are also arranged at the same pitch P (see FIG. 15), however, the five X-sliders are not arranged at the same pitch. The X-sliders are arranged to slip off every one-fifth P from SXA to SXE, such as in FIG. 15, so that the distances between SXE and SXD, SXD and SXC, SXC and SXB, and SXB and SXA are P·N + one-fifth P respectively, wherein N is a predetermined positive integer. The second stator 113 which is fixed to the first movable element 43 by bolt 124 in FIG. 16 also moves along the X-axis together with the movement of the first movable element 43.

FIG. 17 is a sectional view taken along the line II—II which cuts the Y-sliders SYB and SYB' in FIG. 14. In FIG. 17, the second movable element 41 can move along the Y-axis by means of roller 42 (42') rotatable on the surface 112 (FIG. 14) of the second stator 113. The roller 42 is fixed rotatably to the second movable element 41 by a pin 131 (131'). The second movable element 41 is further provided with the Y-slider, that is the second slider, SYB, (SYB'). Other Y-sliders (SYA, SYA'), (SYC, SYC'), (SYD, SYD') and (SYE, SYE') are also fixed to the second movable element 43 on both its sides in a manner such as shown in FIG. 18. FIG. 18 shows only the arrangement of the Y-sliders SYA, . . . SYE. The Y-sliders SYA, SYB . . . SYE (SYA', SYB' . . . SYE') have a plurality of slider teeth 132 (132') surrounded by the exciting coil 133 (133') and cooperate electromagnetically with the second stator teeth 114 (114') of the second stator 113 through a small constant air gap g' (in FIG. 17). The constancy of the air gap g' is maintained along the Y-axis by means of roller 44 which is fixed rotatably to the second movable element 41 by a pin 130 ( '). The moving action of the Y-sliders is the same as previously explained with reference to the X-sliders in FIG. 16. Thus, the Y-sliders, as well as the second movable element 41, can move smoothly and in fine steps to any position along the Y-axis. Further, the second movable element 41 can also move along the X-axis, together with the first movable element 43.

The third movable element 60 is located on the top surface of the second movable element 41 via a bellows 134 which is described hereinafter. The third movable element 60 is provided with the third slider 115 (115') which has a plurality of slider teeth 135 (135') along the Z-axis. The plurality of slider teeth 135 (135') are arranged at the same pitch P (see FIG. 17). The second movable element 41 is provided with the third stator pieces SZA, SZB, SZC, SZD and SZE (SZA', SZB', SZC', SZD' and SZE') on its outside surface and each of the third stator pieces has a plurality of stator teeth 136 (136') which are arranged at the pitch P along the Z-axis. The arrangement of each third stator piece 135 (135') along the Z-axis can be seen in FIG. 7. They are arranged to slip off every one-fifth P from SZA to SZE, such as in FIG. 17, so that the distances between SZE and SZD, SZD and SZC, SZC and SZB, and SZB and SZA are $P \cdot N'$ + one-fifth P respectively, wherein $N'$ is a predetermined positive integer. Each third stator piece is surrounded by exciting coils 137 (137'). When respective exciting coils are energized, the third slider 115 (115') moves quickly, with fine steps, maintaining the small air gap "g'''" by means of roller 138 (138') to any position along the Z-axis. The third movable element 60 can then move along the X-, Y- and Z-axes.

FIG. 19 is a perspective view of a third embodiment of the pulse operated linear motor according to the present invention. The major part is the same as the second embodiment shown in FIG. 14, so further detailed explanation is not essential. Those parts differing from the second embodiment are as follows. The first movable element 43 moves along the X-axis by means of roller 47 which rotates on a surface of the base 140. The second stator 113 is rotated through 90° with respect to the second stator 113 of the second embodiment shown in FIG. 14, setting the surface of the second stator teeth 114 parallel to the X-Y plane. The detailed construction of the second and third movable elements and other elements will be clarified by FIG. 20. FIG. 20 is a sectional view taken along the line III—III which cuts the Y-slider SYB and SYB' (not shown) in FIG. 19. The function of each element is equal to each corresponding element shown in FIG. 17 indicated by the same reference numerals and symbols.

Another object of the present invention is, as previously mentioned to provide a balancing apparatus. The attractive force produced between the third sliders and the third stator pieces should be utilized only to drive the third movable element 60 along the Z-axis; however, the attractive force is countermanded by the gravitational pull of the weights of the third sliders, as well as the third movable element and the work located on the top surface of the third movable element. Therefore, the efficiency of the attractive force is decreased. It is obvious that a balancing apparatus should be included in the pulse operated linear motor according to the present invention, in order to eliminate the effect of the weight of the third sliders, as well as the third movable element and the work, which decrease the efficiency of the driving force along the Z-axis.

A first embodiment of the balancing apparatus is given in FIG. 17. The balancing apparatus consists mainly of a bellows 134, made of, for example, cloth or rubber and is air tight. The upper end of the bellows 134 is fixed to the bottom surface of the third movable element 60 and the lower end of the bellows 134 is fixed to the top surface of the second movable element 41. The bellows 134 expands and contacts under the control of a high pressure fluid such as air, oil or water. This high pressure fluid is applied to the bellows 134 through a hole 141 in the third movable element 60 which can, of course, be substituted by a pipe. FIG. 21 is a block diagram of a pressure control apparatus for a high pressure apparatus. In FIG. 21, reference numeral 151 indicates a high pressure fluid source. High pressure fluid is applied through an adjusting valve 152 to the bellows 134. The adjusting valve 152 is variable and decreases the pressure of the high pressure fluid to a predetermined value, for example, 1.5 atm. Reference numeral 153 indicates a control valve which controls the pressure in the bellows 134 to maintain it at a predetermined value. When the bellows 134 is contracted by a downward movement of the third movable element 60, the pressure in the bellows 134 is simultaneously increased. At this moment, the control valve 153 discharges the high pressure fluid from its outlet. When the bellows 134 is expanded by an upward movement of the third movable element 60, the pressure in the bellows 134 is simultaneously decreased. At this time, said outlet of the control valve 153 is closed. The pressure in the bellows increases to the predetermined value under the control of the adjusting valve 152. Thus, the gravitational pull of the third sliders, as well as the third movable element and the work are countermanded by the bellows 134, the adjusting valve 152, the control valve 153 and the high pressure fluid source 151. It should be noted that a work located on the third movable element 60 can be held at any position along the Z-axis by the balancing apparatus where energization of the exciting coil has stopped. In addition, the driving force along the Z-axis caused by the attractive force between the third sliders and the third stator pieces is fully utilized to drive a work in a direction along the Z-axis.

The balancing apparatus, as mentioned above, can also be achieved without using the bellows 134. third movable bellows 134 can be substituted, for example, by air flow. The balancing apparatus using air flow is shown in FIG. 20. High pressure air flow is applied from a nozzle 161 which is connected to a pipe 162. The high pressure air is provided from a high pressure source, such as indicated by 151 in FIG. 21, to the nozzle 161 through the pipe 162. The air flow pressure is controlled by a pressure control apparatus as is indicated by 152 in FIG. 21 at a pressure level whereby the weight of the third sliders, as well as the third movable element and the work are completely countermanded.

What is claimed is:

1. A pulse operated linear motor comprising:
  a first movable element which moves only along a first direction;
  a second movable element located on the first movable element which moves individually only along a second direction perpendicular to the first direction;
  a third movable element located on the second movable element which moves individually only along a third direction perpendicular to the first and second directions;

a first electromagnetic driving means providing a driving force to the first movable element, which consists of a first member having a plurality of first teeth made of magnetic materials and arranged with a predetermined constant pitch along the first direction and consists of a first magnetizing member having a plurality of first magnetizing teeth which act as pole pieces and are arranged with a predetermined constant pitch along the first direction, the first magnetizing teeth being surrounded by first exciting coils and being energized thereby;

a second electromagnetic driving means providing a driving force to the second movable element, which consists of a second member having a plurality of second teeth made of magnetic materials and arranged with a predetermined constant pitch along the second direction and consists of a second magnetizing member having a plurality of second magnetizing teeth which act as pole pieces and are arranged with a predetermined constant pitch along the second direction, the second magnetizing teeth being surrounded by second exciting coils and being energized thereby;

a third electromagnetic driving means providing a driving force to the third movable element, which consists of a third member having a plurality of third teeth made of magnetic materials and arranged with a predetermined constant pitch along the third direction, and consists of a third magnetizing member having a plurality of third magnetizing teeth which act as pole pieces and are arranged with a predetermined constant pitch along the third direction, the third magnetizing teeth being surrounded by third exciting coils and being energized thereby.

2. A pulse operated linear motor as set forth in claim 1 including:

a balancing means which countermands a downward force, caused by gravitational pull, exerted on at least one of said movable elements.

* * * * *